Sept. 11, 1923.
G. R. SCHUELER
1,467,737
OIL OR LIKE PRESS OR EXPRESSING APPARATUS OF THE WORM SCREW TYPE
Filed March 21, 1922
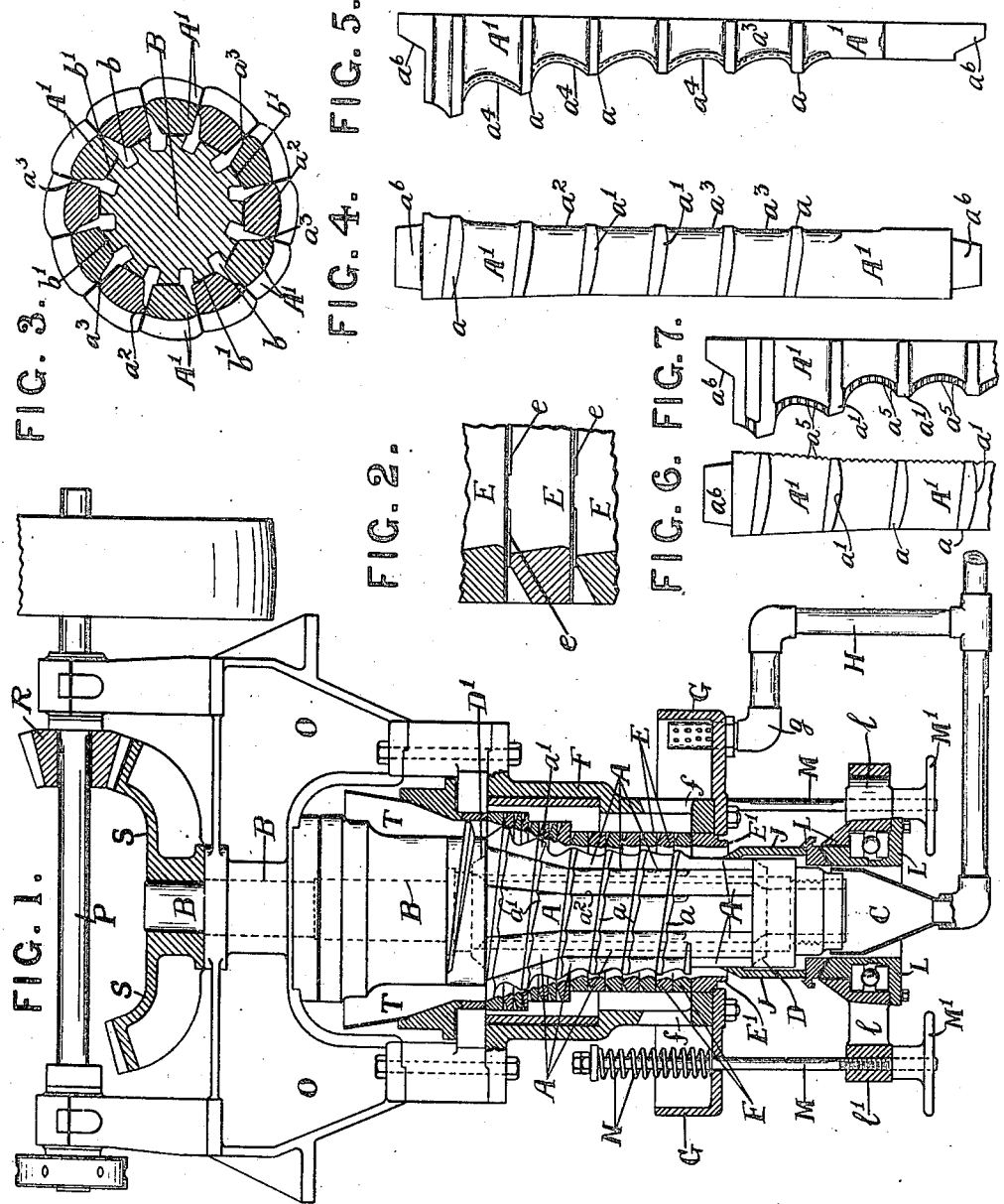

Patented Sept. 11, 1923.

1,467,737

UNITED STATES PATENT OFFICE.

GEORGE RICHARD SCHUELER, OF KINGSTON-UPON-HULL, ENGLAND.

OIL OR LIKE PRESS OR EXPRESSING APPARATUS OF THE WORM-SCREW TYPE.

Application filed March 21, 1922. Serial No. 545,515.

*To all whom it may concern:*

Be it known that I, GEORGE RICHARD SCHUELER, a citizen of the United States of America, residing at Kingston-upon-Hull, in the county of York, England, have invented certain new and useful Improvements in Oil or like Presses or Expressing Apparatus of the Worm-Screw Type, of which the following is a specification.

This invention has reference to presses or expressing apparatus of the worm screw type.

My invention has for its object, improvements in presses or expressing apparatus of the kind referred to thereby to allow of more satisfactory expression of oil or other fluid from the material subjected to the action of the press or apparatus, and of an increased quantity of the same being expressed.

In the accompanying drawings, Fig. 1 represents a vertical press or expressing apparatus in accordance with my invention, partly in section, Fig. 2 is a section of a portion of three of the rings of which, according to one mode, the compression chamber of the apparatus is constructed, Fig. 3 is a section through the compressing worm and its shaft, the view representing the bottom of the portion shown, Fig. 4 is a front view of one of the sections or pieces of which the compressing worm screw is built up, Fig. 5 is a view of one side of the same, Fig. 6 is a similar view to Fig. 4 but shows the section or piece provided with grooves in one of its side faces and Fig. 7 is a side view of Fig. 6.

Figs. 2 to 7 inclusive are drawn to a larger scale than Fig. 1.

In carrying out my invention, I construct the compressing worm screw A (Fig. 1) of a plurality of longitudinal sections or pieces $A^1$ of the kind shown in Figs. 4 to 7 inclusive of the drawings, each of which sections or pieces is provided with several portions of the worm thread $a$ whereby, when the several sections or pieces are placed together side by side around the worm shaft B, the whole of the sections or pieces form a worm screw provided with the necessary thread. The worm screw may be of a regular or continuous taper throughout the whole of its length or depth, or it may be of varying tapers, that is to say, a portion of it may be of a given taper, another portion of a smaller taper, and another portion of a still smaller taper, and so on throughout a portion or the whole of its length or depth.

The face or periphery of each thread portion on each section or piece of the worm may be, and is by preference, widened or enlarged at or towards what is its delivery end, as indicated at $a^1$ in Figs. 4 and 6, and the space between each thread portion is gradually decreased in area towards the delivery end to form a kind of hump $a^2$ at the delivery end of each space, such hump-like portions being preferably beveled or rounded off until their bottoms come in line with the commencement of the spaces in the next section or piece, the object of these enlarged or thickened portions being to effect a kneading action on the inner face of the material being compressed, thereby to more satisfactorily effect the expression of the oil or other fluid from the solid matter by preventing the formation of a skin which, if allowed to form, would prevent the escape of the oil or fluid.

Each section or piece has one or both of its side faces slightly recessed at the ends of the spaces between the thread portions as shown in Fig. 4 of the drawings, in which one side face is shown recessed, as indicated at $a^3$, the recesses being formed either in the solid face, or in a rib $a^4$ formed on the face, or as an alternative, the side faces, or one of the same, may be provided with grooves or small channels $a^5$ as shown in Figs. 6 and 7, these recesses or grooves being in communication with longitudinal grooves or passages $b$ in the periphery of the compressing worm shaft B (Fig. 3) through which recesses or grooves some of the expressed oil or fluid escapes between each two sections of the worm screw to the worm shaft B and through the grooves or passages $b$ in the circumference thereof, into a funnel or receiver C and thence to the storage tank or the like.

The worm sections or pieces $A^1$ when arranged around the shaft B are caused to engage such shaft by any suitable means whereby they will rotate therewith, as for example, the shaft may be provided with flats $b^1$, see Fig. 3, and the back of each section or piece be formed flat, the flat backs of the sections or pieces bearing on the flats on the shaft, and such sections or pieces are prevented from moving vertically or longitudinally on such shaft, depending upon whether the compression chamber of the apparatus, and consequently the worm screw, is vertical, or in a horizontal plane, by any suitable means, as for example, by providing the worm shaft B with internally coned fixed collars D and D¹ and the top and bottom or two ends of the worm sections or pieces with tapered portions $a^6$ to fit thereinto.

The casing or compression chamber of the apparatus, in which the worm screw rotates, is, according to one mode constructed of a number of rings E (or it may be of staves) so arranged that the interior of such chamber corresponds more or less with the taper or general shape of the compressing worm A, the stepped, corrugated or like portions of the inside face of such chamber crossing the direction of travel of the material being forced through such chamber, so having a kneading action on the outer portion of the material passing through the chamber and at the same time preventing a skin which would prevent the escape of oil or fluid, from forming thereon.

The chamber is provided with grooves or passages $e$ from the inside to the outside, such grooves or passages being preferably located between each two rings or staves, or between some of the same, to allow the escape to the outside of the chamber of oil or fluid expressed, other than that which escapes between the worm sections, the said chamber being preferably enclosed by a preferably solid outer casing F having outlets $f$ through which the oil or fluid which escapes through the rings or staves passes into a collecting trough or receiver G which is conveniently provided with an outlet $g$ through which the oil or fluid can pass through a pipe H to the storage tank.

At the bottom or delivery end of the compression chamber, I fit an adjustable pressure member preferably in the form of a ring J having a conical or tapered top or end adapted to enter the bottom or delivery end $E^1$ of the compression chamber to regulate the size of the passage through which the resultant meal or solid matter is extruded and so allow of the pressure put on the material by the compressing worm screw being regulated.

Adjustment of the pressure ring or member J may be effected by any suitable means, the means shown in the accompanying drawing consisting in providing a thrust bearing L on which the pressure ring or member J is supported, a portion of such thrust bearing being provided with arms $l$, three being a suitable number of such arms, each arm being provided with a lug or enlargement $l^1$ through which is a hole through which a spindle M is passed, the said spindle having a screw threaded portion on which is an internally threaded handwheel or the like $M^1$. The spindles, two only of which are shown, pass up through the bottom of the trough or receiver G, and on each of the same is placed a spiral spring N which is normally in expension, the said springs being seated on the inside of the bottom of the trough or receiver G, their top ends abutting against the heads, or a washer or the like on the top of the spindles and tending to force the thrust bearing carrying the pressure ring or member downwards or outwards, depending upon whether the machine is arranged vertically or horizontally. By turning the hand-wheels or the like $M^1$ in one or other direction, the pressure ring or member J can be adjusted to regulate the size of the annular passage through which the meal or solid matter is extruded and consequently the pressure put on the material by the compressing worm screw.

The machine is mounted on or carried by a suitable frame such as O for example, and is driven in any suitable manner, the arrangement shown consisting of a shaft P rotatable in bearings on the top of the frame O and provided with a bevel wheel R which gears with a bevel wheel S on the top of the compressing worm shaft B.

The material from which the oil or other fluid is to be expressed is fed by any suitable means into the space T which forms the admission to the compression chamber.

If desired, instead of the compressing worm screw being tapered, it may be of one diameter or a portion or portions may be of one diameter and a portion or portions of a different diameter; furthermore, it may be of the odinary type, that is to say, although built up of sections or pieces as before described, the width of the periphery of the thread may be the same throughout the entire thread and the depth and width of the space between the thread may be the same throughout the length or depth of the worm.

What I claim and desire to secure by Letters Patent is:—

1. A compressing worm, comprising a central shaft, and a series of longitudinal worm sections secured side by side around the shaft and provided with portions of spiral screwthreads.

2. A compressing worm as set forth in claim 1, and having projections on its screwthreads, said projections extending longitudinally of the worm and operating to decrease the space between its screwthreads at predetermined points.

3. A compressing worm as set forth in claim 1, and having projections on the peripheral portions of its sections between its screwthreads, said projections operating to increase the diameter of the worm at predetermined points.

4. A compressing worm as set forth in claim 1, and having longitudinal discharge passages for fluid between the side portions of its worm sections adjacent to the said shaft.

5. A compressing worm as set forth in claim 1, and having small transverse grooves for fluid in the side portions of its worm sections adjacent to the periphery of the worm.

6. A compressing worm as set forth in claim 1, and having longitudinal passages for fluid formed in the periphery of the said shaft opposite the joints between the worm sections.

7. A compressing worm as set forth in claim 1, and having corresponding flat surfaces on the said shaft and on the backs of the said worm sections, so that the worm sections are constrained to revolve with the shaft.

8. The combination, with a compressing worm as set forth in claim 1, of collars secured to the shaft and inclosing the end portions of the said worm sections.

In testimony whereof I affix my signature.

GEORGE RICHARD SCHUELER.